(12) United States Patent
Wheeler et al.

(10) Patent No.: US 11,189,174 B2
(45) Date of Patent: Nov. 30, 2021

(54) ACCELEROMETER-BASED EXTERNAL SOUND MONITORING FOR VOICE CONTROLLED AUTONOMOUS PARKING

(71) Applicant: Ford Global Technologies, LLC, Dearborn, MI (US)

(72) Inventors: Joshua Wheeler, Trenton, MI (US); Scott Andrew Amman, Milford, MI (US); Ranjani Rangarajan, Farmington Hills, MI (US); Leah Busch, Berkley, MI (US); John Edward Huber, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 193 days.

(21) Appl. No.: 16/690,451

(22) Filed: Nov. 21, 2019

(65) Prior Publication Data
US 2020/0090520 A1 Mar. 19, 2020

Related U.S. Application Data

(62) Division of application No. 15/722,800, filed on Oct. 2, 2017, now Pat. No. 10,580,304.

(51) Int. Cl.
*G08G 1/16* (2006.01)
*G08G 1/133* (2006.01)
(Continued)

(52) U.S. Cl.
CPC ............. *G08G 1/168* (2013.01); *B60K 37/06* (2013.01); *B60Q 1/50* (2013.01); *B60Q 5/00* (2013.01); *B60Q 5/005* (2013.01); *B60R 16/0373* (2013.01); *B60W 30/06* (2013.01); *G05D 1/021* (2013.01); *G08G 1/133* (2013.01); *B60K 2370/148* (2019.05); *B60Y 2400/304* (2013.01)

(58) Field of Classification Search
CPC ........ G08G 1/168; G08G 1/133; G05D 1/021; G10L 15/22; G10L 2015/223; B60Q 1/50; B60Q 5/005; B60Q 5/00; B60W 30/06; B60K 37/06; B60K 2370/148; B60R 16/0373; B60R 16/023; B60Y 2400/304; B62D 15/0285; B62D 1/00
See application file for complete search history.

(56) References Cited

U.S. PATENT DOCUMENTS 9,637,117 B1 * 5/2017 Gusikhin ................. G08G 1/14
2013/0191189 A1 * 7/2013 Aparicio ................ G07B 15/02
705/13

(Continued)

*Primary Examiner* — Mary Cheung
(74) *Attorney, Agent, or Firm* — Frank Lollo; Eversheds Sutherland (US) LLP

(57) ABSTRACT

Method and apparatus are disclosed for accelerometer-based external sound monitoring for voice controlled autonomous parking. An example vehicle includes a body control module, an infotainment head unit, and an autonomy unit. The example body control module communicatively couples to a mobile device. The example infotainment head unit communicatively couples to an accelerometer mounted on a window of the vehicle. The example autonomy unit autonomously parks the vehicle in response to a first key word detected by the accelerometer when (i) a button is activated on the infotainment head unit and (ii) a message from the mobile device is being periodically received.

10 Claims, 3 Drawing Sheets

(51) Int. Cl.
  *B60K 37/06* (2006.01)
  *B60R 16/037* (2006.01)
  *G05D 1/02* (2020.01)
  *B60Q 5/00* (2006.01)
  *B60Q 1/50* (2006.01)
  *B60W 30/06* (2006.01)

(56) References Cited

U.S. PATENT DOCUMENTS

2016/0207528 A1* 7/2016 Stefan ................... B60W 30/06
2017/0144654 A1* 5/2017 Sham ................... G05D 1/0088
2018/0082588 A1* 3/2018 Hoffman, Jr. .......... G08G 1/166
2018/0292829 A1* 10/2018 Li ......................... B60W 50/10
2018/0336007 A1* 11/2018 Li ........................... G06F 3/167
2018/0374002 A1* 12/2018 Li ........................... G06F 3/017

* cited by examiner

ACCELEROMETER-BASED EXTERNAL SOUND MONITORING FOR VOICE CONTROLLED AUTONOMOUS PARKING

CROSS-REFERENCE TO RELATED APPLICATIONS

The present disclosure claims priority to, the benefit of, and is a divisional application of U.S. application Ser. No. 15/722,800, filed Oct. 2, 2017, which is hereby incorporated by reference herein in its entirety.

TECHNICAL FIELD

The present disclosure generally relates to remote parking assist systems and, more specifically, accelerometer-based external sound monitoring for voice controlled autonomous parking.

BACKGROUND

A semi-autonomous vehicle is a vehicle that is normally operated by a driver, but certain specialized functions are autonomous. For example, some vehicles have adaptive cruise control or autopilot that facilitates, in certain circumstances, the vehicle controlling its speed and following distance independent of driver controlling input. Increasingly, vehicles are equipped with parking assist functions that park and unpark the vehicle. However, in some scenarios, vehicles need to be parked into and removed from narrow parking spaces (or the parking space becomes narrow after the vehicle is parked) in which there is not enough room to open a door of the vehicle. In such scenarios, the driver cannot exit the vehicle after it parks or enter the vehicle to leave the parking space.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for accelerometer-based external sound monitoring for voice controlled autonomous parking. An example vehicle includes a body control module, an infotainment head unit, and an autonomy unit. The example body control module communicatively couples to a mobile device. The example infotainment head unit communicatively couples to an accelerometer mounted on a window of the vehicle. The example autonomy unit autonomously parks the vehicle in response to a first key word detected by the accelerometer when (i) a button is activated on the infotainment head unit and (ii) a message from the mobile device is being periodically received.

An example system includes a mobile device and a vehicle. The mobile device includes a first button that, when pressed, causes the mobile device to broadcast a heartbeat message. The vehicle (a) presents a second button in response to detecting a parking spot proximate the vehicle, (b) perform speech recognition on signals from an accelerometer mounted on a window of the vehicle to detect vocal commands; and (c) when the heart beat message is being received and the second button is activated, autonomously parks into the parking spot in response to receiving a first vocal command.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
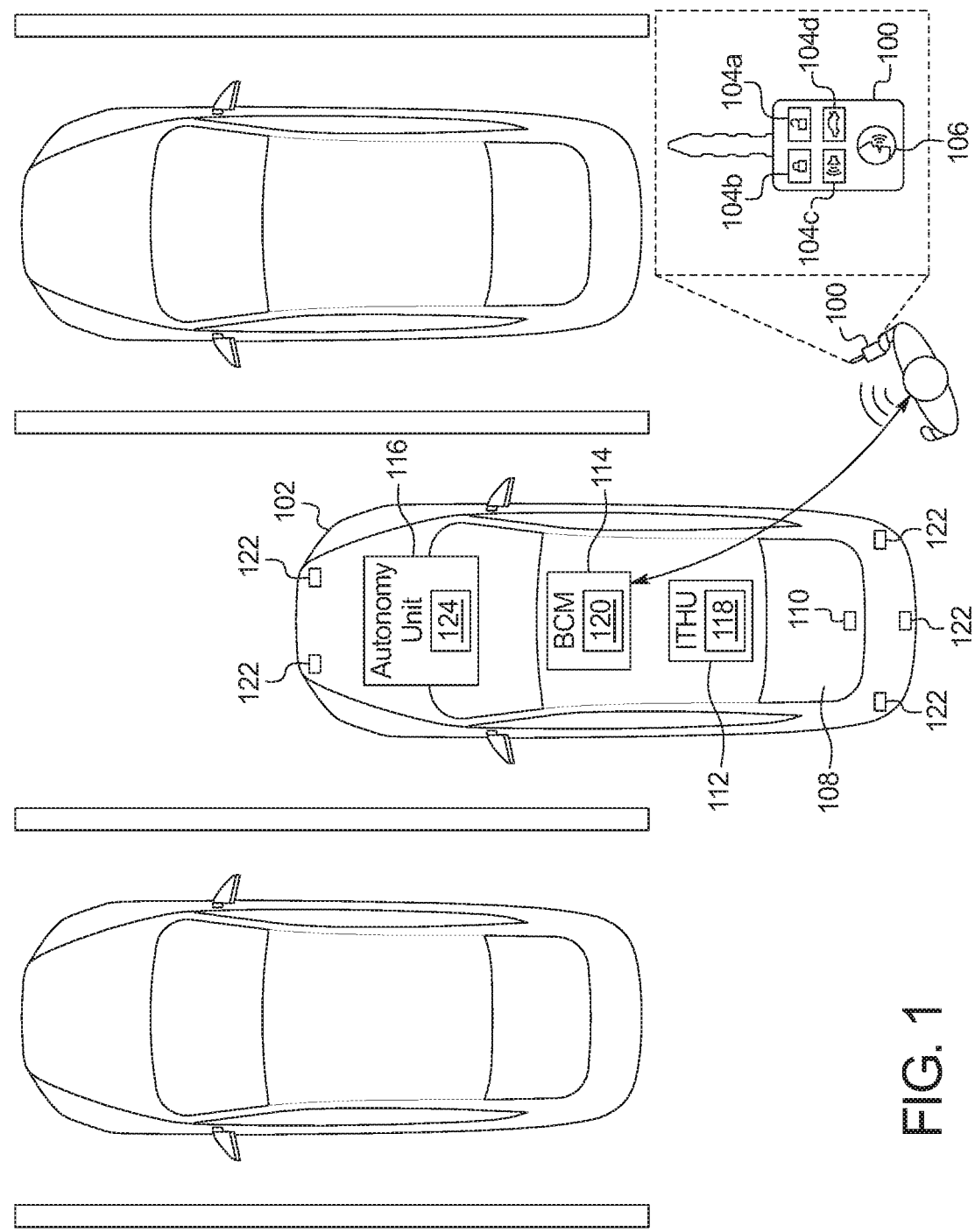
FIG. 1 illustrates a system with a key fob and a vehicle operating in accordance to the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Remote park assist (RePA) systems autonomously park a vehicle when a driver is outside the vehicle. Currently, normal parking spaces are 7.5 to 9.0 feet wide. However, as space in urban areas becomes more valuable and vehicles with remote parking assist become more common, parking spaces will become narrower. For example, a parking space may be designed to have a three inch clearance on each side of the vehicle. In such conditions, occupants of the vehicle must exit the vehicle before it parks.

As disclosed below, in conjunction with a key fob, a driver uses voice commands to control the parking and unparking of the vehicle. However, traditional electric condenser microphones (ECMs) are not constructed for external use. Their delicate microphone diaphragms can be rendered unusable by dirt, snow, rain, or mud. Instead, because sound causes oscillation as it travels through a medium, accelerometers are placed on one or more of the edge of vehicle glass surfaces. This oscillation is measured as a vibration by the accelerometer when the pressure wave impinges on a window of the vehicle. The resulting electrical output from the accelerometer is processed by an analyzed by a speech recognition system. The accelerometers are installed on one or more of the windows (e.g., the windshield, the back glass, the left front door glass, the left backseat door glass, the right front door glass, the right backseat door glass, the moon roof, etc.) of the vehicle.

To use the remote parking assist, a driver stops the vehicle in the vicinity of a parking spot in a location where the occupant(s) of the vehicle can exit the vehicle. The driver activates the remote parking assist using physical or soft controls provided by the infotainment head unit and/or the infotainment system. The vehicle detects the parking spot using range detection sensors (e.g., ultrasonic sensors, radar, lidar, cameras, etc.) and calculates a path from the vehicle's current position into the parking spot. The path may include one or more maneuvers that adjust the angle and/or speed of the vehicle. A driver holds key fob or mobile device (e.g., smart phone, smart watch, etc.) associated with the vehicle. While pressing a button on the key fob or mobile device, the driver gives vocal commands to start the assisted parking operations. In some examples, the button is a dedicated button on the key fob that is used only for activating the assisted parking system. The vehicle detects, via the accelerometers on the window, the voice commands and a signal from the key fob or mobile device generated by the button press. The vehicle also determines the distance between the key fob or mobile device and the vehicle (e.g., based on the received signal strength indicator (RSSI) of the signal). When (i) the voice command matches a key word or phrase (e.g., "Start" or "Park"), (ii) the button on the key fob or mobile device is pressed, and (iii) the key fob or mobile device is within a threshold distance (e.g., 6 meters (19.67 feet)) of the vehicle, the vehicle (a) acknowledges receipt of the command (e.g., via an audible or visual alert) and (b) starts the assisted parking feature to park in the parking spot. In some examples, the key word or phrase is preceded by a wake-up-word. The wake-up-ward can be any word selected by the manufacturer or the driver, such an uncommon word (e.g., "Sync," etc.) or a name (e.g., "Clara," etc.). The vehicle continues to autonomously park until (a) the vehicle completes the parking maneuvers, (b) the button on the key fob or mobile device is not pressed, (c) the key fob or mobile device is outside the threshold distance, or (d) the vehicle receives a vocal command to stop (e.g., a key word of phrase such as "Stop").

FIG. 1 illustrates a system with a key fob 100 and a vehicle 102 operating in accordance to the teachings of this disclosure. The key fob 100 is configured to remotely instruct the vehicle 102 to perform operations, such as locking and unlocking its doors and/or unlatching the trunk, etc. The illustrated example depicts a key fob; however, the vehicle 102 may be communicatively coupled to any suitable mobile device (e.g., a smart phone, a smart watch, etc.) that includes an application to cause the mobile device to act like a key fob. The key fob 100 includes a radio transmitter and an antenna. The radio transmitter is configured to have a range of approximately 15 feet to 50 feet. Additionally, the radio transmitter is tuned to a particular operating frequency. For example, the operating frequency may be 315 MHz (for North America) or 433.92 MHz (for Europe). Alternatively or additionally, in some examples, the key fob 100 includes a short-range wireless module with hardware and firmware to establish a connection with the vehicle 102. In some examples, the short-range wireless module implements the Bluetooth and/or Bluetooth Low Energy (BLE) protocols. The Bluetooth and BLE protocols are set forth in Volume 6 of the Bluetooth Specification 4.0 (and subsequent revisions) maintained by the Bluetooth Special Interest Group.

In the illustrated example, the key fob 100 includes hard (e.g., physical) or soft (e.g., virtual) buttons 104a-104d that correspond to various functions that the key fob 100 is capable of requesting from the vehicle 102. For example, the key fob 100 may include a door unlock button 104a, a door lock button 104b, an alarm button 104c, and/or a trunk open button 104d. Additionally, the key fob 100 includes a remote parking assist (RePA) button 106. Pressing the buttons 104a-104d and 106 causes the key fob 100 to send, via a radio transmitter and an antenna, messages to the vehicle 102 that include specific commands to communicate the desired action to the vehicle 102. For example, pressing the door unlock button 104a once causes the key fob 100 to send a message to unlock the front driver's side door and pressing the door unlock button 104a twice in rapid succession causes the key fob 100 to send a different command to unlock all the doors of the vehicle 102. The RePA button 106 is a button dedicated to enabling the remote parking assist function of the vehicle 102. While pressed, the RePA button 106 causes the key fob 100 to periodically send a message (sometimes referred to as a "heartbeat message") to the vehicle 102 indicating that the RePA button 106 is pressed. For example, while pressed, the RePA button 106 may cause the key fob 100 to broadcast the message every 500 milliseconds.

The vehicle 102 may be a standard gasoline powered vehicle, a hybrid vehicle, an electric vehicle, a fuel cell vehicle, and/or any other mobility implement type of vehicle. The vehicle 102 includes parts related to mobility, such as a power train with an engine, a transmission, a suspension, a driveshaft, and/or wheels, etc. The vehicle 102 may be semi-autonomous (e.g., some routine motive functions controlled by the vehicle 102) or autonomous (e.g., motive functions are controlled by the vehicle 102 without direct driver input). In the illustrated example the vehicle 102 includes windows 108, one or more accelerometers 110, an infotainment head unit (ITHU) 112, a body control module (BCM) 114, and an autonomy unit 116.

The windows 108 include a windshield, a back glass, a left front door glass, a left backseat door glass, a right front door glass, a right backseat door glass, and/or a moon roof. Some of the windows 108 are made of laminated glass (sometimes referred to as "safety glass") (e.g., the windshield, etc.) and some of the windows 108 are made of non-laminated tempered glass (e.g., the left front door glass, the left backseat door glass, the right front door glass, the right backseat door glass, etc.). The glass of the windows 108 vibrates when struck by sound waves.

The accelerometer(s) 110 may be any type of accelerometer that (a) measures the vibrations perpendicular to the plane of glass of the corresponding window 108 and (b) measures a wide frequency range (e.g., the frequency range of audible sound, etc.), including uniaxial or triaxial accelerometers, micromachined or piezoelectric accelerometers, etc. The accelerometer(s) 110 is/are rigidly mounted on one or more of the windows 108 on the interior of the cabin of the vehicle 102. In the illustrated example, the accelerometers 110 is mounted on the back glass window. In some examples, to improve the arc behind the vehicle 102 in which the vocal commands are received by the vehicle 102, the accelerometers are installed on other windows 108, such as the left backseat door glass and/or the right backseat door glass.

The infotainment head unit 112 provides an interface between the vehicle 102 and a user. The infotainment head unit 112 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers.

In the illustrated example, the infotainment head unit 112 includes hardware (e.g., a processor or controller, memory, storage, etc.) and software (e.g., an operating system, etc.) for an infotainment system 118 (such as SYNC® and MyFord Touch® by Ford®, Entune® by Toyota®, IntelliLink® by GMC®, etc.). Additionally, the infotainment head unit 112 displays the infotainment system 118 on, for example, the center console display. The infotainment system 118 provides an interface to facilitate a user enabling the voice command remote parking assist system, via, for example, a touch screen-based menu. Alternatively or additionally, in some examples, the infotainment head unit 112 includes a back-lit button. To signal that the remote assist parking system is available, the back-lit button illuminates when the autonomy unit 116 has detected parking space in which the vehicle 102 will fit and the vehicle 102, in its current position, can maneuver into.

Additionally, the infotainment system 118 receives the signal(s) from the accelerometer(s) 110 and performs speech recognition on the signals when the voice command remote parking assist system has been enabled. The infotainment system 118 determines whether the voice command represented by the signal from the accelerometer(s) 110 matches a wake-up-word followed by a key word or phrase. In some examples, the key word or phrase vocabulary that the infotainment system 118 understands is small. For example, the key word or phrase vocabulary may only include "park" and "stop." In other examples, the key word or phrase vocabulary may also include rudimentary directions, such as "turn left" and "turn right." In some examples, the key word or phrase vocabulary includes words (e.g., "power down," etc.) that will cause the body control module 114 to secure the vehicle 102 (e.g., turn off the engine, lock the doors, etc.) after the autonomy unit 116 autonomously parks the vehicle 102.

The body control module 114 controls various subsystems of the vehicle 102. For example, the body control module 114 may control power windows, power locks, an immobilizer system, and/or power mirrors, etc. The body control module 114 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. The body control module 114 controls the lights (e.g., the head lights, the tail lights, etc.) the horn of the vehicle 102. The body control module 114 includes a remote keyless entry module 120 that wirelessly receives messages from the key fob 100. When the key fob 100 is authorized and a message from the key fob 100 includes an instruction to operate a function of the vehicle 102 (e.g., unlock the doors, open the trunk, sound the alarm, etc.), the body control module 114 performs those functions. Additionally, the remote keyless entry module 120 estimates the distance the key fob 100 is from the vehicle 102 based on the received signal strength indicator (RSSI) of the signal between the key fob 100 and the remote keyless entry module 120. In some examples, in response to receiving instructions from the infotainment head unit 112, the body control module 114 locks the doors.

The autonomy unit 116 is in communication with the electronic control units (ECUs) that control the motive functions (e.g., steering, brake, and throttle, etc.) of the vehicle 102. In some examples, in response to receiving instructions from the infotainment head unit 112, the autonomy unit turns off the engine of the vehicle 102. The autonomy unit 116 includes hardware and firmware to facilitate navigating the vehicle 102 in various traffic scenarios autonomously without driver intervention using camera(s), range detection sensors 122 (e.g., automotive radar, LiDAR, ultrasonic sensors, etc.) and/or navigational data/vehicle position data (e.g., coordinates from global positioning system (GPS) receivers, horizon data, vehicle status data from an inertial measurement unit (IMU), etc.). In the illustrated example, the autonomy unit 116 includes a remote parking assist module 124.

The remote parking assist module 124, when enabled via the infotainment system 118, determines a location and orientation of a proximate parking space using the range detection sensors 122. Based on the location and orientation of a proximate parking space and the location and orientation of the vehicle 102, the remote parking assist module 124 determines a path that includes one or more maneuvers to get the vehicle 102 into the parking space. When the parking space is detected and a valid path is determined, the remote parking assist module 124 causes the back-lit button on the infotainment head unit 112 to illuminate and/or a soft button to appear on the infotainment system 118.

After the back-lit button or the soft button is pressed, the remote parking assist module 124 waits to execute the path until the corresponding voice command is received from the infotainment head unit 112 and an indication that the RePA button 106 is pressed on the key fob 100 is received from the body control module 114. In some examples, the remote parking assist module 124 acknowledges receipt of a recognized voice command by signally using the head lights and/or tail lights, and/or briefly activating the horn of the vehicle 102. Additionally, the remote parking assist module 124 does not perform the maneuvers when the key fob 100 is not within a threshold distance (e.g., 6 meters (19.67 feet), etc.) of the vehicle 102. The remote parking assist module 124 continues to autonomously park until (a) the remote parking assist module 124 completes the parking maneuvers, (b) the remote keyless entry module 120 does not receive a message indicating that the RePA button 106 on the key fob 100 is pressed after a threshold period of time (e.g., 750 milliseconds, etc.), (c) the key fob 100 is outside the threshold distance, or (d) the remote parking assist module 124 receives a vocal command to stop via the infotainment head unit 112.

When the vehicle 102 is parked into the parking spot, the remote parking assist module 124 will back up upon receiving an instruction from the infotainment head unit 112 triggered by a voice command when the RePA button 106 on the key fob is pressed and the key fob 100 is within the threshold distance. In some example the vehicle backs up or returns to the original pre-park position until (a) the vehicle 102 has backed up a target distance (e.g., a car length, two car lengths) or is in the original pre-park position, (b) the remote keyless entry module 120 does not receive a message indicating that the RePA button 106 on the key fob 100 is pressed after a threshold period of time (e.g., 750 milliseconds, etc.), the key fob 100 is outside the threshold distance, or (d) the remote parking assist module 124 receives a vocal command to stop via the infotainment head unit 112.

Figure 2:
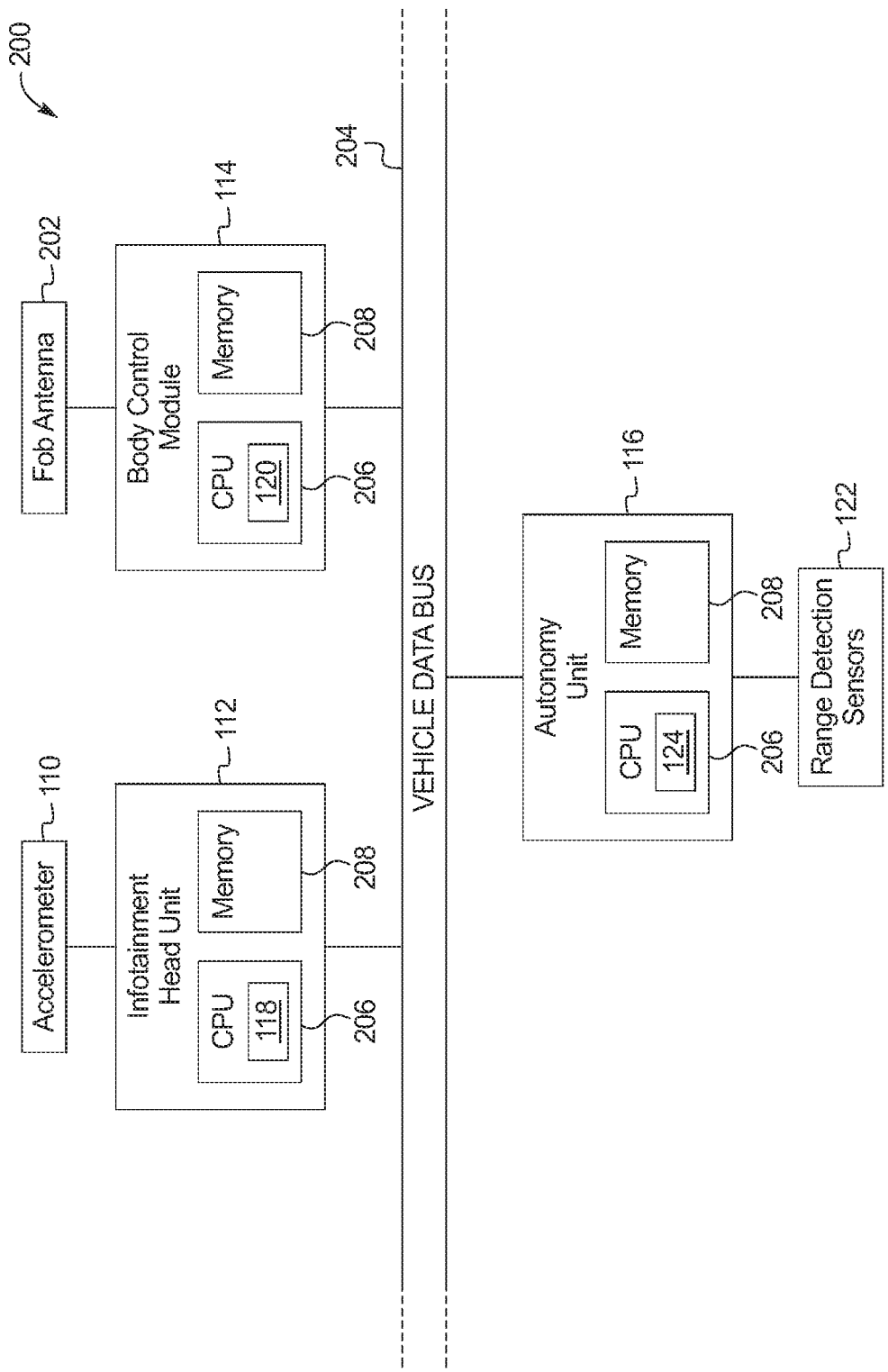
FIG. 2 is a block diagram of electronic components of the vehicle of FIG. 1.

FIG. 2 is a block diagram of electronic components 200 of the vehicle 102 of FIG. 1. In the illustrated example, the electronic components 200 include the accelerometer 110, the infotainment head unit 112, the body control module 114, the autonomy unit 116, the range detection sensors 122, a key fob antenna 202, and a vehicle data bus 204.

In the illustrated example, the infotainment head unit 112, the body control module 114, the autonomy unit 116 each include a processor or controller 206 and memory 208. The example infotainment head unit 112 is structured to include the infotainment system 118. The example the body control module 114 is structured to include the remote keyless entry module 120. The example autonomy unit 116 is structured to include the remote parking assist module 124. The processors or controllers 206 may be any suitable processing device or set of processing devices such as, but not limited to: a microprocessor, a microcontroller-based platform, a suitable integrated circuit, a digital signal processor (DSP), one or more field programmable gate arrays (FPGAs), and/or one or more application-specific integrated circuits (ASICs). The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 208 includes multiple kinds of memory, particularly volatile memory and non-volatile memory.

The memory 208 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 208, the computer readable medium, and/or within the processor 206 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 204 communicatively couples the infotainment head unit 112, the body control module 114, and the autonomy unit 116. In some examples, the vehicle data bus 204 includes one or more data buses. The vehicle data bus 204 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
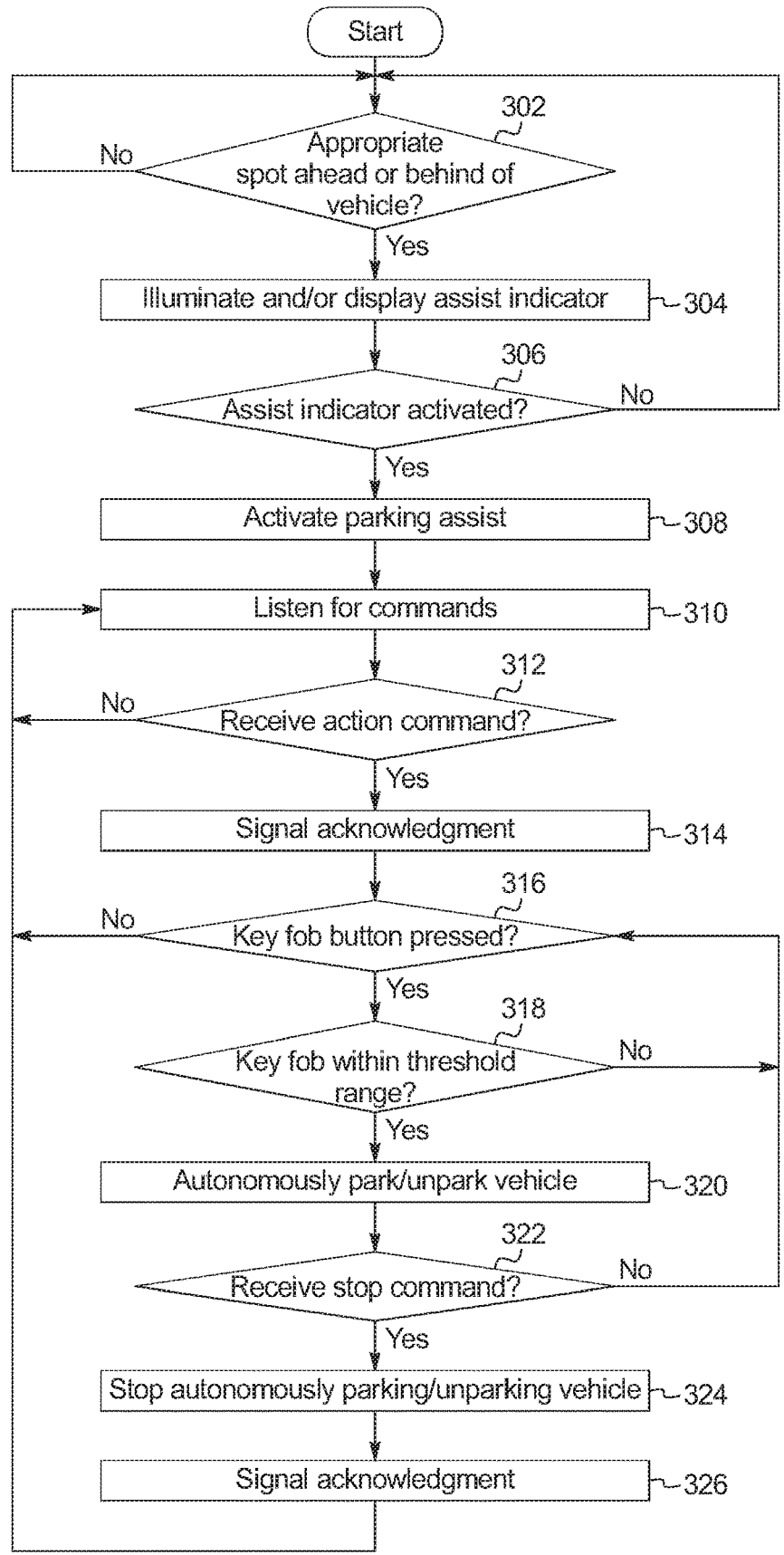
FIG. 3 is a flowchart of a method to remotely park a vehicle using an accelerometer-based external sound monitoring system, which may be implemented by the electronic components of FIG. 2.

FIG. 3 is a flowchart of a method to remotely park the vehicle 102 using an accelerometer-based external sound monitoring system, which may be implemented by the electronic components 200 of FIG. 2. Initially, at block 202, the autonomy unit 116 waits until the vehicle 102 is stopped proximate a parking spot. At block 304, when the autonomy unit 116 detects, via the range detection sensors 122, that the vehicle 102 is parked proximate the parking spot, the infotainment head unit 112 illuminates a back-lit button and/or provides a soft button on the infotainment system 118 to indicate that remote parking assist system is available. At block 306, the autonomy unit 116 determines whether the remote parking assist system is enabled via the button on the infotainment head unit 112. When the remote parking assist system is enabled, the method continues to block 308. Otherwise, when the remote parking assist system is not enabled, the method returns to block 302

At block 308, the autonomy unit 116 activates the parking assist system and determines a path into the parking space. At block 310, the infotainment system 118 listens for voice commands received via the signal(s) from the accelerometer(s) 110 affixed to the window(s) 108. At block 312, the infotainment head unit 112 determines whether key word or phrase and, in some examples, a wake-up-word, have been received by analyzing the signal(s) from the accelerometer(s) 110. If the key word or phrase and, in some example, the wake-up-word have been received, the method continues to block 314. Otherwise, the method returns to block 310.

At block 314, the autonomy unit 116 signals acknowledgement of the command (e.g., via the body control module 114). At block 316, the autonomy unit 116 determines whether the RePA button 106 on the key fob 100 is pressed (e.g., via the body control module 114). When the RePA button 106 is pressed, the method continues at block 318. Otherwise, when the RePA button 106 is not pressed, the method returns to block 310. At block 318, the autonomy unit 116 determines whether the key fob 100 is within a threshold distance of the vehicle 102 (e.g., via the body control module 114). When the vehicle 102 is within a threshold distance, the method continues to block 320. Otherwise, when the vehicle 102 is not within the threshold distance, the method returns to block 310.

At block 320, the autonomy unit 116 starts/continues to autonomously park or unpark the vehicle 102 according to the path determined at block 308. At block 322, the autonomy unit 116 determines whether the driver has vocally commanded the vehicle 102 to stop (e.g., via the infotainment head unit 112). When the driver has vocally commanded the vehicle 102 to stop, the method continues at block 324. Otherwise, when driver has not vocally commanded the vehicle 102 to stop, the method returns to block 310. At block 324, the autonomy unit 116 stops autonomously parking/unparking the vehicle 102. At block 326, the autonomy unit 116 acknowledges the command (e.g., via the body control module 114).

The flowchart of FIG. 3 is representative of machine readable instructions stored in memory (such as the memory 208 of FIG. 2) that comprise one or more programs that, when executed by a processor (such as the processor 206 of FIG. 2), cause the vehicle 102 to implement the example infotainment system 118, the example remote keyless entry module 120, the example remote parking assist module 124 and, more generally, the example infotainment head unit 110, the example body control module 114 and/or the example autonomy unit 116 of FIGS. 1 and 2. Further, although the example program(s) is/are described with reference to the flowchart illustrated in FIG. 3, many other methods of implementing the example infotainment system 118, the example remote keyless entry module 120, the example remote parking assist module 124 and, more generally, the example infotainment head unit 110, the example body control module 114 and/or the example autonomy unit 116 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system comprising:
   a mobile device with a first button that, when pressed, causes the mobile device to broadcast a heartbeat message; and
   a vehicle to:
      present a second button in response to detecting a parking spot proximate the vehicle;
      perform speech recognition on signals from an accelerometer mounted on a window of the vehicle to detect vocal commands; and
      when the heartbeat message is being received and the second button is activated, autonomously park into the parking spot in response to receiving a first vocal command.

2. The system of claim 1, wherein the vehicle is to stop autonomously parking when the heartbeat message is not received from the mobile device after a threshold period of time.

3. The system of claim 1, wherein the vehicle is to stop autonomously parking in response to detecting a second vocal command.

4. The system of claim 1, wherein the vehicle is to determine a distance between the vehicle and the mobile device.

5. The system of claim 4, wherein the vehicle is to autonomously park into the parking spot in response to receiving the first vocal command when the heartbeat message is being received, the second button is activated, and the distance between the vehicle and the mobile device is less than a threshold distance.

6. The system of claim 4, wherein the vehicle is to stop autonomously parking when the distance between the vehicle and the mobile device is greater than a threshold distance.

7. The system of claim 1, wherein after parking, the vehicle is to shut off an engine and lock doors in response to receiving a second vocal command.

8. The system of claim 1, wherein the vehicle is to when the heartbeat message is being received and the second button is activated, autonomously remove the vehicle from the parking spot in response to receiving a second vocal command different from the first vocal command.

9. The system of claim 8, wherein to remove the vehicle from the parking spot, the vehicle is to move in reverse a car length.

10. The system of claim 8, wherein to remove the vehicle from the parking spot, the vehicle is to move to a same position as before the vehicle autonomously parked in the parking spot.

\* \* \* \* \*